United States Patent
Tayama et al.

(10) Patent No.: US 6,220,017 B1
(45) Date of Patent: Apr. 24, 2001

(54) EXHAUST EMISSION CONTROL SYSTEM FOR INTERNAL COMBUSTION ENGINE

(75) Inventors: Akira Tayama; Toshikazu Shiino; Hirofumi Tsuchida; Keiji Okada, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/338,435

(22) Filed: Jun. 23, 1999

(30) Foreign Application Priority Data

Jun. 26, 1998 (JP) .................................................. 10-180070

(51) Int. Cl.⁷ ...................................................... F01N 3/00
(52) U.S. Cl. ................................................. 60/277; 60/285
(58) Field of Search ............................ 60/276, 277, 285; 204/400; 73/23.31, 23.32

(56) References Cited

U.S. PATENT DOCUMENTS

| | | | |
|---|---|---|---|
| 4,792,387 | * 12/1988 | Ishihara et al. | 204/425 |
| 5,182,907 | * 2/1993 | Kuroda et al. | 60/277 |
| 5,249,453 | * 10/1993 | Usami et al. | 73/23.32 |
| 5,259,189 | * 11/1993 | Baier et al. | 60/277 |
| 5,271,816 | * 12/1993 | Tanaka et al. | 204/428 |
| 5,433,071 | * 7/1995 | Willey et al. | 60/285 |
| 5,584,176 | * 12/1996 | Meyer et al. | 60/285 |
| 5,822,979 | * 10/1998 | Hamburg et al. | 60/277 |
| 5,867,982 | * 2/1999 | Tengblad et al. | 60/285 |
| 5,887,421 | * 3/1999 | Mitsutani | 60/277 |
| 5,927,068 | * 7/1999 | Schenk | 60/277 |
| 6,073,440 | * 6/2000 | Douta et al. | 60/277 |
| 6,079,203 | * 6/2000 | Wakamota | 60/277 |

FOREIGN PATENT DOCUMENTS

| | | |
|---|---|---|
| 8-303280 | 11/1996 | (JP) . |
| 9-126012 | 5/1997 | (JP) . |
| 411036849 | * 2/1999 | (JP) . |

OTHER PUBLICATIONS

Kraffahrttechnisches Taschenbuch/Bosch 22$^{nd}$ edition, 1995, pp. 490–493.
Patent Abstract, JP 0100180070, 1998.

* cited by examiner

Primary Examiner—Thomas Denion
Assistant Examiner—Diem Tran
(74) Attorney, Agent, or Firm—Foley & Lardner

(57) ABSTRACT

An exhaust emission control system for an internal combustion engine is provided. The exhaust emission control system comprises a catalytic converter disposed in an exhaust passage of the engine, a wide-range A/F ratio sensor disposed in the exhaust passage at a location downstream of the catalytic converter for detecting an A/F ratio of a mixture supplied to the engine, and a control unit including a detecting section for detecting the degree of water gas reaction caused in the catalytic converter and a correcting section for correcting a detected value of the A/F ratio on the basis of the degree of water gas reaction.

9 Claims, 14 Drawing Sheets

—— CASE 1 (14.4 : 1)
---- CASE 2 (14.3 : 1)
—— CASE 3 (13.7 : 1)
----- CASE 4 (13.2 : 1)
------- CASE 5 (12.5 : 1)

EXHAUST EMISSION CONTROL SYSTEM FOR INTERNAL COMBUSTION ENGINE

BACKGROUND OF THE INVENTION

1. Field of the Invention

The present invention relates in general to exhaust emission control systems for internal combustion engines and particularly to an internal combustion engine exhaust emission control system of the type having a catalytic converter and a wide-range A/F (air/fuel) ratio sensor disposed downstream of the catalyic converter.

2. Description of the Related Art

For cleaning the exhaust gas emitted from an automotive internal combustion engine, a catalyst carrying thereon precious metals as platinum and rhodium or other metals has heretofore been used. Such a catalyst oxidizes and reduces harmful pollutants as HC, CO, NOx in the exhaust gas and thereby cleans the exhaust gas. For effective cleaning, it is necessary to control an A/F ratio of the internal combustion engine. Particularly, for removing HC, OD, NOx from the exhaust gas simultaneously, it is necessary to control the A/F ratio so that the A/F ratio is accurately held at the stoichiometric ratio. To this end, as is well known, a sensor for detecting the A/F ratio is disposed upstream or downstream of the catalytic converter to control the A/F ratio of the mixture to be supplied to the internal combustion engine and therefore the oxygen ($O_2$) concentration in the exhaust gas on the basis of the output of the sensor.

An oxygen sensor which is put into one of two alternative operation conditions in response to the oxygen concentration in the exhaust gas, is relatively widely used. However, in recent years, a wide-range A/F ratio sensor which is capable of detecting the value of the A/F ratio of itself is also widely used for the necessity of performing a feedback control of the A/F ratio within a lean A/F ratio region.

Referring to FIG. 1 which illustrates a principle of a wide-range A/F ratio sensor, the sensor includes two cells 21 and 22 each having a zirconia base and a pair of electrodes disposed on the opposite sides of the base. Formed between the two cells 21 and 22 is a measurement gap 24 into which the exhaust gas is introduced from an exhaust passage. On the side of the cell 22 opposite to the m assent gap 24, there is also formed an atmospheric chamber 25 into which the air is introduced to serve as a reference gas. Indicated by 26 is a heater and by 27 is an amplifier. In this A/F ratio sensor, the exhaust gas is conducted into the measurement gap 24 by diffusion. An electronic circuit regulates the current applied to the cell 21 to maintain a constant gas composition in the measurement gap 24. In case the A/F ratio is lean, the cell 21 is energized so that the oxygen in the exhaust gas and of nitrogen monoxide having come into the measurement gap 24 is pumped out of the measurement gap 24. On the basis of the current (pumping current) necessitated for this pumping, the A/F ratio is obtained. On the contrary, in case the A/F ratio is rich, the A/F ratio is obtained on the basis of the current (pumping current) necessitated for generating oxygen for oxidizing reducing substances as carbon monoxide, hydrogen and hydrocarbon within the measurement gap 24. As shown in FIG. 3, if the A/F ratio is stoichiometric, the pumping current is "0". Positive pumping current is produced if the A/F ratio is lean, and negative pumping current if rich.

In this maimer, basically, the concentration of oxides and the concentration of reducing substances existing in the exhaust gas are obtained on the basis of electric current. The exhaust gas enters the measurement gap 24 by diffusion, so there is a problem that depending upon the different diffusion speeds, the above described gaseous elements differ in the time necessary for them to arrive the detecting portion (i.e., electrode surface), from each other. The diffusion speed is almost dependent upon the size of molecule (molecule weight). Oxygen and nitrogen oxide which are the components to be detected w the A/F ratio is lean, are nearly equal in the molecule weight and therefore nearly equal in the diffusion speed, so that there is not caused any particular problem. However, hydrogen ($H_2$) and carbon monoxide (CO) which are components to be detected when the A/F ratio is rich, differ largely in the molecule weight and therefore in the diffusion speed. Hydrogen which is smaller in the size of molecule diffuses faster than oxygen and therefore arrives the electrode surface faster. For this reason, in case the concentration of hydrogen and the concentration of carbon monoxide in the exhaust gas are the same, hydrogen arrives the electrode surface faster so hydrogen requires, for its oxidation at the electrode surface, four times the pumping current which is required by oxygen. That is, even if hydrogen and carbon monoxide are equal in the concentration, hydrogen which arrives the detecting portion faster is detected as being four times richer in the concentration of reduced gas. However, on the side upstream of the catalytic converter, the ratio between hydrogen and carbon monoxide contained in the exhaust gas is nearly constant at any time. Thus, by previously determining the relation between the pumping current and the A/F ratio when the exhaust gas is mixed with hydrogen and carbon monoxide at a constant rate, i.e., the characteristic indicated by the solid line in FIG. 3, the pumping current can be converted to the A/F ratio by using this characteristic when the actual A/F ratio is to be detected.

Though in FIG. 3 the relation between the pumping current and the A/F ratio is shown by the straight line, the both does not actually have such a simply proportional relation. Thus, When the pumping current is to be actually converted to the A/F ratio, the A/F ratio is read on a map storing values of A/F ratios corresponding to a plurality of values of pumping current and by interpolation thereof.

SUMMARY OF THE INVENTION

However, in case the wide-range A/F ratio sensor is disposed downstream of the catalytic converter, the ratio between hydrogen and carbon monoxide contained in the exhaust gas is varied by the so-called water gas reaction, thus causing a problem that the detected value of the A/F ratio varies under the influence of the water gas reaction.

On the catalyst, there is caused, in addition to oxidation and reduction of HC, CO, NOx, etc., a water gas reaction for causing water and carbon monoxide contained much in the exhaust gas to react with each other to produce hydrogen and carbon dioxide.

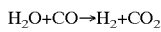

$$H_2O + CO \rightarrow H_2 + CO_2$$

The degree of this reaction varies depending upon the catalyst temperature and the degree of catalyst deterioration. However, when this reaction occurs, the content of hydrogen in the exhaust gas increases. That is, as shown in FIG. 2, the concentration of carbon monoxide reduces whereas the concentration of hydrogen increases on the downstream side, as cared with those on the upstream side. Accordingly, the downstream A/F ratio sensor produces an erroneous output indicating that the A/F ratio is richer than the actual or true A/F ratio.

In the meantime, when the A/F ratio is in the lean region, there exists scarcely any carbon monoxide due to oxidation by the catalyst and therefore there is produced scarcely any hydrogen. Since the A/F ratio sensor detects oxygen and nitrogen monoxide, there is not caused any actual influence on the detection of the A/F ratio even when the A/F ratio sensor is disposed downstream of the catalytic converter. Namely, the sensor produces the similar output to that obtained when the A/F ratio sensor is disposed upstream of the catalytic converter. However, when the A/F ratio is in the rich region, the above described water gas reaction is caused by the catalyst, so that the absolute value of the hydrogen concentration on the downstream side becomes higher as cared with that on the upstream side. That is, the A/F ratio sensor produces an output indicating that the A/F ratio is richer than the actual or true A/F ratio. Since the carbon monoxide concentration increases with increase of the richness of the A/F ratio, the hydrogen concentration on the side downstream of the catalytic converter becomes higher, thus enhancing the above phenomenon, i.e., increasing the difference between the detected value of the A/F ratio and the actual or true A/F ratio.

For example, even by the use of a catalyst which contains a relatively small amount of cerium which is considered as causative of the water gas reaction, the A/F ratio sensor downstream of the catalytic converter produces an output corresponding to an A/F ratio of about 12.5:1 when the actual A/F ratio is 13.5:1.

FIG. 4 shows how the detected value of the A/F ratio varies depending upon variations of a reaction constant K representative of the degree of water gas reaction, particularly with respect to five kinds of A/F ratios whose actual A/F ratios are 12.5:1, 13.2:1, 13.7:1, 14.3:1 and 14.4:1.

In the meantime, the influence of water gas reaction on the downstream side of the catalytic converter is disclosed in Japanese Patent Provisional Publication Nos. 8-303280 and 9-126012. In those publications, the A/F ratio sensor used is not a wide-range A/F ratio sensor but an oxygen sensor which is put into one of two alternative operating conditions in response to the A/F ratio. Furthermore, the former is adapted to inhibit the use of the downstream side sensor until the catalyst is deteriorated, and the latter is adapted to suppress production of hydrogen by supply of oxygen. Thus, either of two cannot realize accurate detection of the A/F ratio by the use of the downstream side A/F ratio sensor, particularly on the rich side of the stoichianetry.

A problem of the prior art exhaust emission control system having a wide-range A/F ratio sensor downstream of a catalytic converter is the catalytic converter causes a so-called water gas reaction to vary that the ratio between hydrogen and monoxide contained in the exhaust gas, so the A/F ratio sensor cannot attain accurate detection of the A/F ratio due to the influence of the water gas reaction.

Various efforts have been made with a view to overcoming the above described problems but there has not been proposed any exhaust emission control system of the above described type whose A/F ratio sensor can attain an accurate detection of the A/F ratio particularly when the mixture is rich (excess fuel in it).

It is accordingly an object of the present invention to provide a novel and improved exhaust emission control system of the type having a wide-range A/F ratio sensor downstream of a catalytic converter, wherein the A/F ratio sensor is free from an influence of a water gas reaction of the catalytic converter and can attain accurate detection of the A/F ratio, particularly when the A/F mixture is rich (excess fuel in it).

To achieve the foregoing object, the present invention provides an exhaust emission control system for an internal combustion engine having an exhaust passage, which comprises a catalytic converter disposed in the exhaust passage, a wide-range A/F ratio sensor disposed in the exhaust passage at a location downstream of the catalytic converter for detecting an A/F ratio of a mixture supplied to the engine, and a control unit including a detecting section for detecting the degree of water gas reaction caused in the catalytic converter and a correcting section for correcting a detected value of the A/F ratio on the basis of the degree of water gas reaction.

BREIF DESCRIPTION OF THE DRAWINGS

DETAILED DESCRIPTION OF THE PROFFERED EMBODIMENTS

Figure 1:
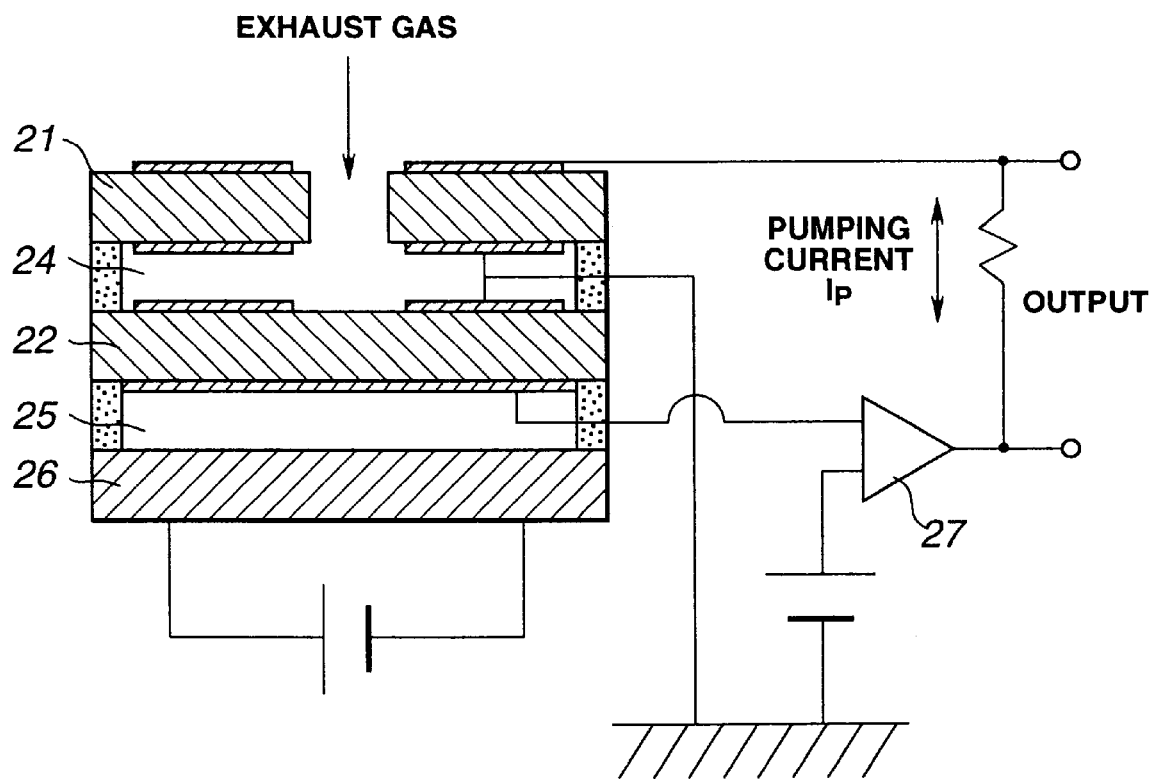
FIG. 1 is a schematic diagram for illustration of a principle range A/F ratio sensor.
Figure 2:
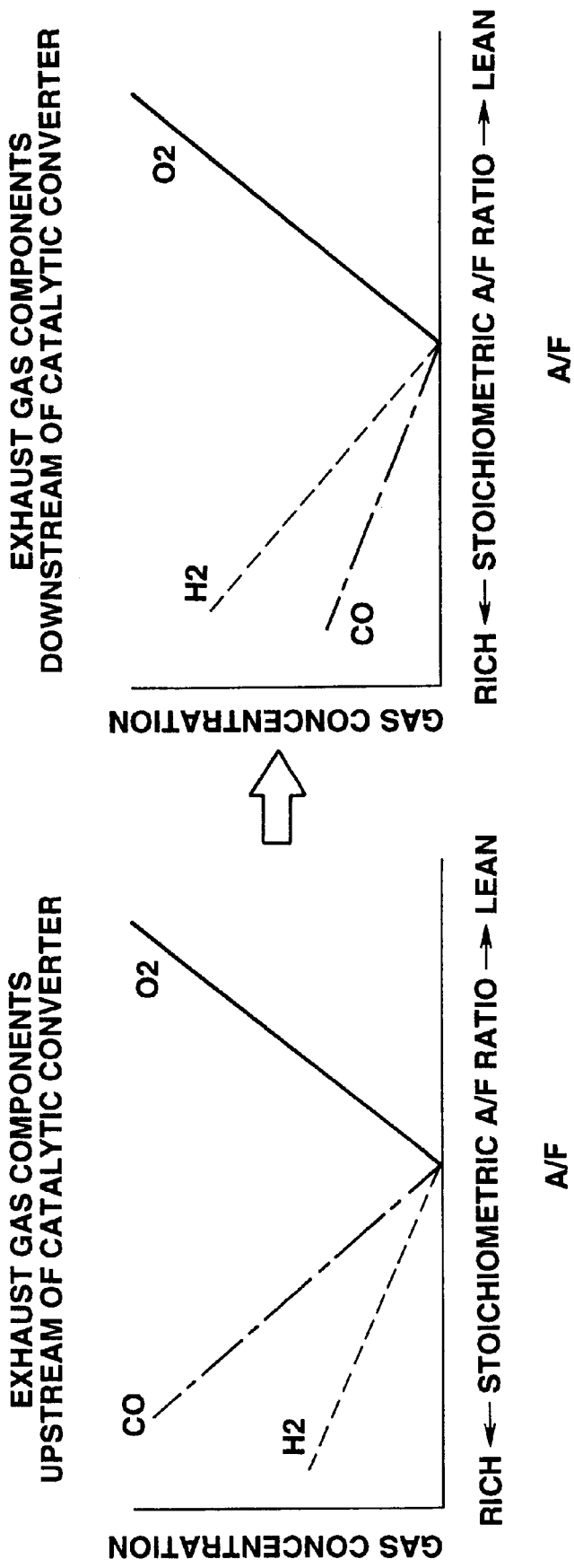
FIG. 2 is a pair of graphs for illustration of a variation of exhaust gas components upstream and downstream of a catalytic converter.
Figure 3:
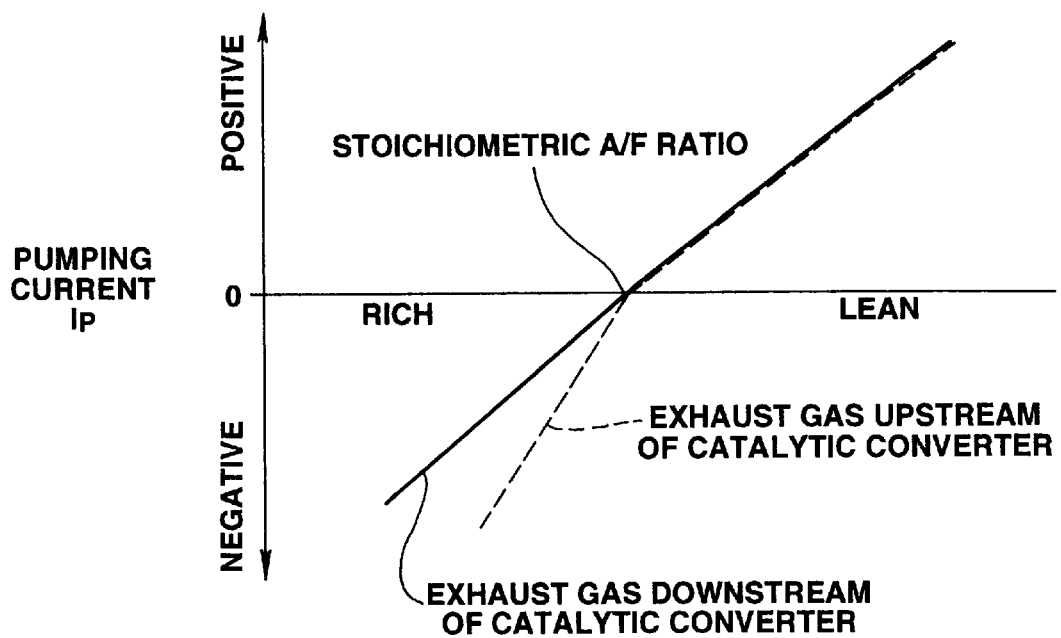
FIG. 3 is a graph of a relation between pumping current and A/F ratio upstream and downstream of the catalytic converter.
Figure 4:
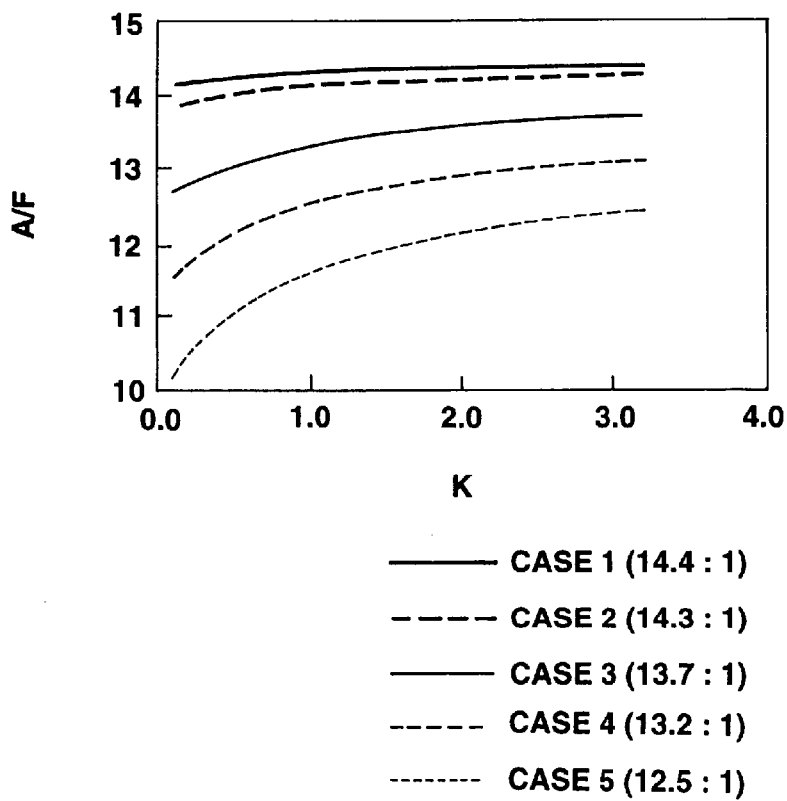
FIG. 4 is a graph of a relation between a reaction constant K of water gas reaction and detected value of A/F ratio.
Figure 5:
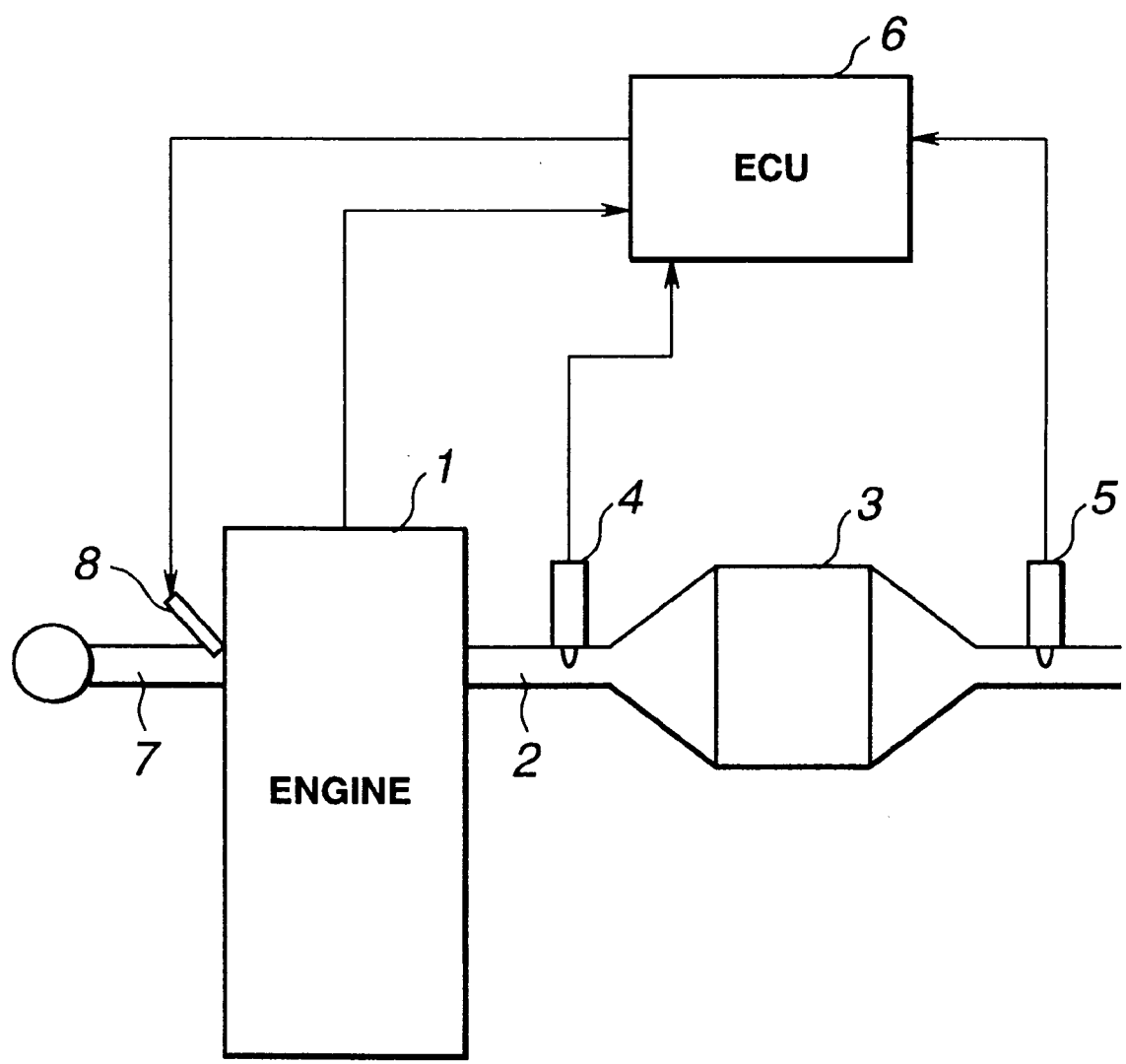
FIG. 5 is a schematic diagram of an exhaust emission control system according to an embodiment of the present invention.

Referring first to FIG. 5, an exhaust emission control system according to a first embodiment of the present invention includes a catalytic converter 3 having a three-way catalyst and disposed in an exhaust pipe or passage 2 of an internal combustion engine 1. Also disposed in the exhaust passage 2 at locations upstream and downstream of the catalytic converter 3 are a first A/F ratio sensor 4 and a second A/F ratio sensor 5 for detecting the A/F ratio, respectively. The both A/F ratio sensors 4 and 5 are the aforementioned wide-range A/F ratio sensors and are adapted to detect the A/F ratios which are represented by pumping current. The detection signals of the A/F ratio sensors 4 and 5 are inputted to an engine control unit (ECU) 6. To an intake pipe or passage 7 of the internal combustion engine 1 is attached a fuel injector 8 which is adapted to inject fuel in response to an injection signal from the ECU 6. Though the fuel injection quantity is basically controlled in accordance with an operating condition of the engine 1, an A/F ratio feedback control is performed on the basis of detection of the A/F ratios by the A/F ratio sensors 4 and 5 so that a target A/F ratio in accordance with an engine operating condition is attained.

Figure 6:
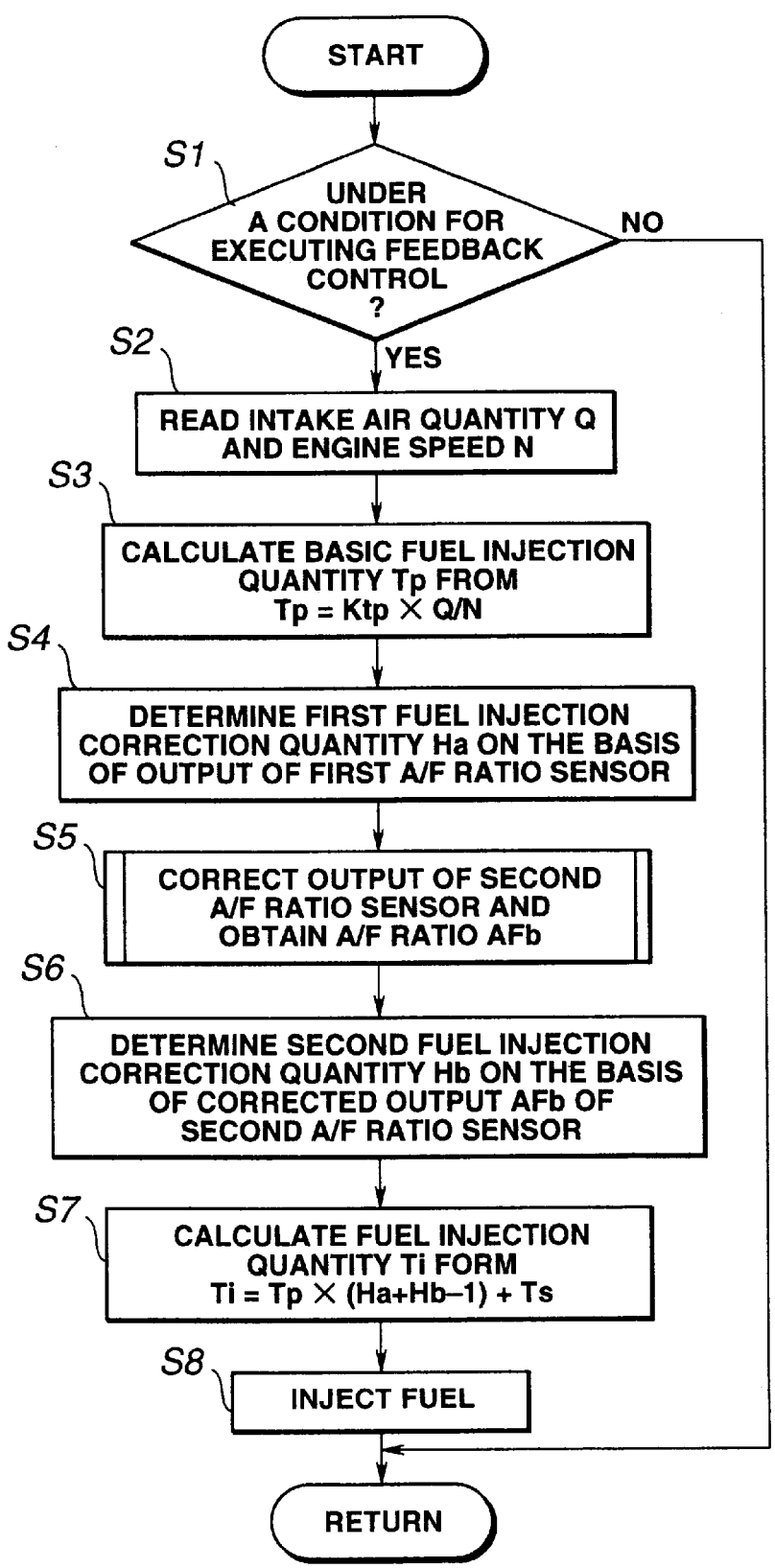
FIG. 6 is a flowchart of an A/F ratio feedback control for use in the embodiment of FIG. 5.

FIG. 6 shows a flowchart of an A/F ratio feedback control executed in the ECU 6. The routine in FIG. 6 is executed, for example, in timed relation to engine speed of the engine 1, repeatedly. Firstly, at step S1, it is judged on the basis of an engine coolant temperature, throttle opening, or the like whether or not it is under a condition for executing an A/F ratio feedback control. For example, when the engine coolant temperature is low or at idling or the like, an open loop control of the A/F ratio is executed in accordance with a routine not shown. When the exhaust emission control system is under a condition for executing the A/F ratio feedback control, the program proceeds to step S2. At step S2, an intake air quantity Q of the engine 1 and the engine speed N are read. At step S3, a basic fuel injection quantity Tp is calculated from the expression of $Tp = Ktp \times Q/N$ where Ktp is a constant.

Figure 11:
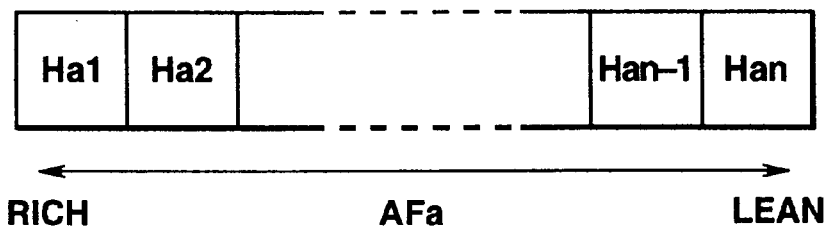
FIG. 11 is an illustration of a map of a fuel injection correction quantity Ha for an output AFa of the first A/F ratio sensor.

Then, at step S4, on the basis of the output (detected A/F ratio) AFa of the first A/F ratio sensor 1 on the upstream side, a first fuel injection correction quantity Ha which is necessary for feedback correction is obtained. The quantity Ha is determined by using a map shown in FIG. 11. In case the target A/F ratio is stoichiometric, the correction quantity Ha takes the value of "1" when the detected A/F ratio AFa is stoichiometric and becomes smaller as the detected A/F ratio AFa becomes richer and becomes larger as the detected A/F ratio AFa becomes leaner than the stoichiometric A/F ratio.

Figure 15:
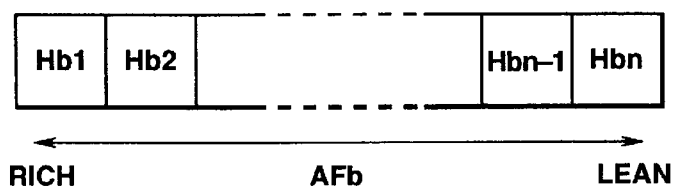
FIG. 15 is an illustration of a map of a second fuel injection correction quantity Hb for an A/F ratio AFb of the second A/F ratio sensor.

At step S5, the output (pumping current) of the second A/F ratio sensor 5 on the downstream side is corrected to obtain the detected A/F ratio AFb on the downstream side. The subroutine for the step S5 will be described later. At step S6, on the basis of the detected-and-corrected downstream side A/F ratio AFb, the second fuel injection correction quantity Hb necessary for feedback correction is obtained similarly to the step S4. The correction quantity Hb is determined by using a map shown in FIG. 15 and takes a value of "1" en the A/F ratio AFb is stoichiometric and becomes smaller as the A/F ratio AFb becomes richer and becomes larger as the A/F ratio AFb becomes leaner than the stoichiometric A/F ratio.

At step S7, on the basis of the basic fuel injection quantity Tp and the first and second fuel injection correction quantities Ha and Hb, the fuel injection quantity Ti is obtained from the following expression:

$$Ti = Tp \times (Ha + Hb - 1) + Ts$$

where Ts is a voltage correction component corresponding to a reactive pulse width and is given in accordance with battery voltage.

In this embodiment, by using the both A/F ratios detected by the first and second A/F ratio sensors 4 and 5 disposed upstream and downstream of the catalytic converter 3, a feedback control of the fuel injection quantity is performed.

Figure 7:
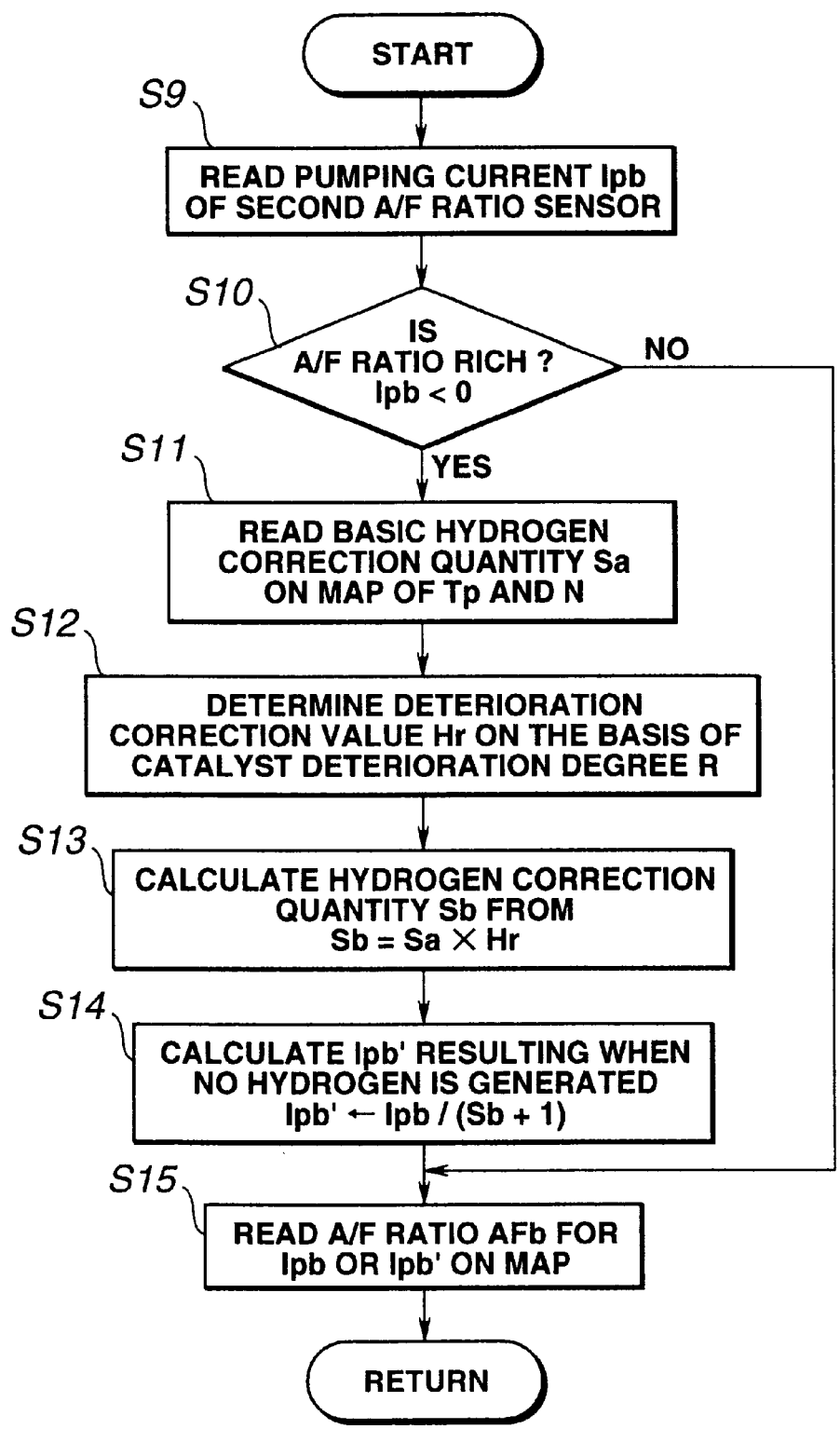
FIG. 7 is a flowchart of a subroutine for correcting the output of a second A/F ratio sensor (i.e., subroutine for the step S5 of the routine of FIG. 6)

FIG. 7 shows a subroutine for the step S5, to which explanation will be made below. At step S9, the pumping current Ipb of the second A/F ratio sensor 5 is read. At step S10, on the basis of the pumping current Ipb, it is judged whether or not the A/F ratio is in the rich region. As described above, the pumping current Ipb becomes "0" at the stoichiometric A/F ratio and becomes negative on the rich side of the stoichiometric, so it is determined whether the pumping current Ipb is negative or not. In case the A/F ratio is judged as lean, there is scarcely an influence of water gas reaction, so no correction is made and the program proceeds to the step S15.

Figure 12:
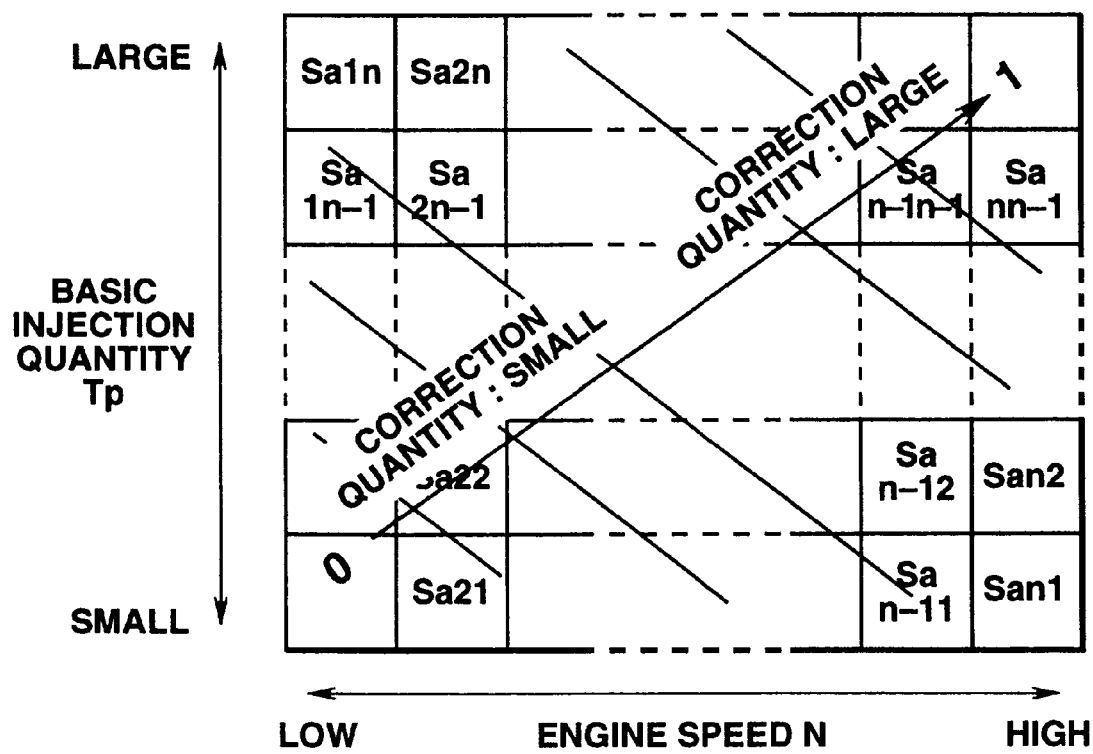
FIG. 12 is an illustration of a map of a basic hydrogen correction quantity Sa for a basic fuel injection quantity Tp and engine speed N.
Figure 13:
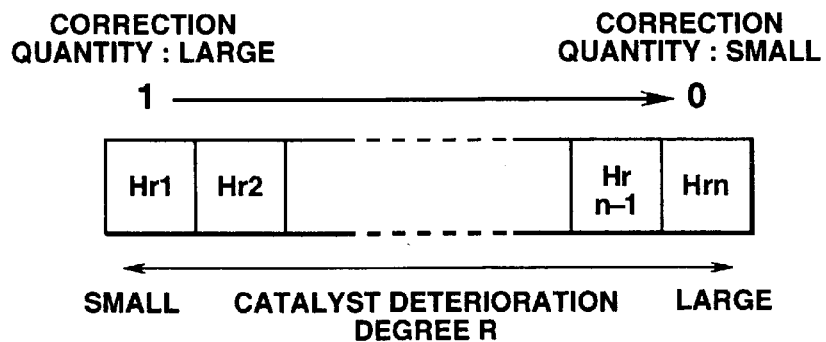
FIG. 13 is an illustration of a map of a deterioration correction quantity Hr for a catalyst deterioration degree R.

In case it is judged at the step S10 that the A/F ratio is rich, the program proceeds to the step S11 to make a correction of the output with respect to the water gas reaction. Firstly, at step S11, on the basis of the basic fuel injection quantity Tp and the engine speed N, the basic hydrogen correction quantity Sa is obtained. The correction quantity Sa is for consideration of the catalyst temperature and determined by using a map having such characteristics shown in FIG. 12. Since the exhaust temperature becomes higher with higher engine speed and load and a higher exhaust temperature makes the water gas reaction more active, the basic hydrogen correction quantity Sa is adapted to become maximum (i.e., "1") in a high speed-high load region and becomes minimum (i.e., "0") in a low speed-low load region. Further, the generated amount of hydrogen varies largely depending upon variations of the catalyst deterioration degree. Thus, at step S12, the deterioration correction value Hr is determined on the basis of the catalyst deterioration degree R. Then, at step S13, the above described basic hydrogen correction quantity Sa is multiplied by the deterioration correction value Hr, whereby to obtain the hydrogen correction quantity Sb. The above described deterioration correction value Hr is determined by using such a map shown in FIG. 13 and becomes "0" when the catalyst deterioration degree R is minimum and "1" when the catalyst deterioration degree R is maximum. The flow of process steps for obtaining the catalyst deterioration degree R will be described later. The catalyst deterioration degree R means that the deterioration degree R is minimum when the catalyst is new and becomes larger as the catalyst deteriorates more.

At step S14, a correction is added to the actual pumping current Ipb in the manner as shown by the following expression, whereby to obtain the corrected pumping current Ipb'.

$$Ipb' = Ipb/(Sb+1)$$

Figure 14:
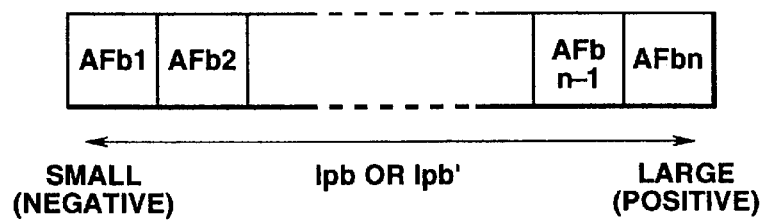
FIG. 14 is an illustration of a map of A/F ratio AFb for pumping current Ipb of the second A/F ratio sensor.

The corrected pumping current Ipb' corresponds to the pumping current resulting when there is no water gas reaction at the catalyst. At step S15, the A/F ratio AFb is determined on the basis of the pumping current Ipb or Ipb'. This is attained by using such a map shown in FIG. 14. In the meantime, when the pump current is "0", the A/F ratio is stoichiometric. The positive side and the negative side of the map correspond to the lean region and rich region of the A/F ratio, respectively.

Herein, the expression for correction at step S14 will be described in detail.

The ratio between hydrogen concentration and carbon monoxide concentration in the exhaust gas emitted from the internal combustion engine 1 can be regarded as being nearly constant irrespective of the A/F ratio, so let the ratio be equal to a constant c, the following expression is obtained.

$$[CO]=c[H_2]$$

where $[CO]$ and $[H_2]$ represent the concentrations of the gases within the parentheses, respectively.

In case the A/F ratio sensor is disposed in such exhaust gas, the resulting pumping current Ipb' is represented by the following expression when consideration is made as to the fact that the sensitivity to hydrogen ($H_2$) is about four times as large as the sensitivity to carbon monoxide (CO).

$$Ipb'=\alpha([CO]+4[H_2])$$
$$=\alpha(c+4)[H_2]$$

where $\alpha$ is a proportionality constant.

When the exhaust gas flows into the catalytic converter and water gas reaction occurs on the catalyst, a portion of CO reacts with the surrounding water to produce $H_2$ and $CO_2$. Each gas concentration in the exhaust gas after occurrence of the water gas reaction, i.e., in the exhaust gas downstream of the catalytic converter, can be expressed by:

$$K=([CO(downstream)][H_2O])/([H_2(downstream)][CO_2])$$

where K is a reaction constant of the water gas reaction. Herein, since the ratio between $H_2O$ and $CO_2$ can be regarded as nearly constant irrespective of variations of the A/F ratio and the degree of water gas reaction, let the ratio be equal to a constant d:

$$dK=[CO(downstream)]/[H_2(downstream)]$$

Further, since an increased portion of $H_2$ concentration and a decreased portion of CO concentration due to the water gas reaction are equal to each other, the following expression can derive from the above expression.

$$dK=([CO]-\Delta)/([H2]+\Delta)$$
$$=(c[H2]-\Delta)/([H2]+\Delta)$$

From the above expression, the increased portion of $H_2$ concentration (=decreased portion of CO concentration) $\Delta$ is:

$$\Delta=[H2](c-dK)/(dK+1)$$

In case the A/F ratio sensor is disposed in such exhaust gas, the resulting pumping current Ipb (downstream) can be expressed by:

$$Ipb(downstream)=\alpha([CO(downstream)]+4[H_2(downstream)])$$
$$=\alpha\{[CO]-\Delta+4([H_2]+\Delta)\}$$
$$=\alpha\{(c+4)[H_2]+3\Delta\}$$

By eliminating $\Delta$ and combining like factors, the pumping current Ipb can be expressed by:

$$Ipb(downstream)=\alpha(c+4)[H2][3(c-dK)/\{(c+4)(dK+1)\}+1]$$

Since c and d are constants, the value of $3(c-dK)/\{(c+4)(dK+1)\}$ varies depending upon only the water gas reaction constant K. By substituting K by Sb which varies in accordance with the degree of the water gas reaction, the following expression can be derived from the above expression so the expression for correction at the step S14 can be obtained.

$$Ipb(downstream)=\alpha(c+4)[H_2](Sb+1)$$
$$=Ipb'(Sb+1)$$
$$Ipb'=Ipb(downstream)/(Sb+1)$$

Figure 8:
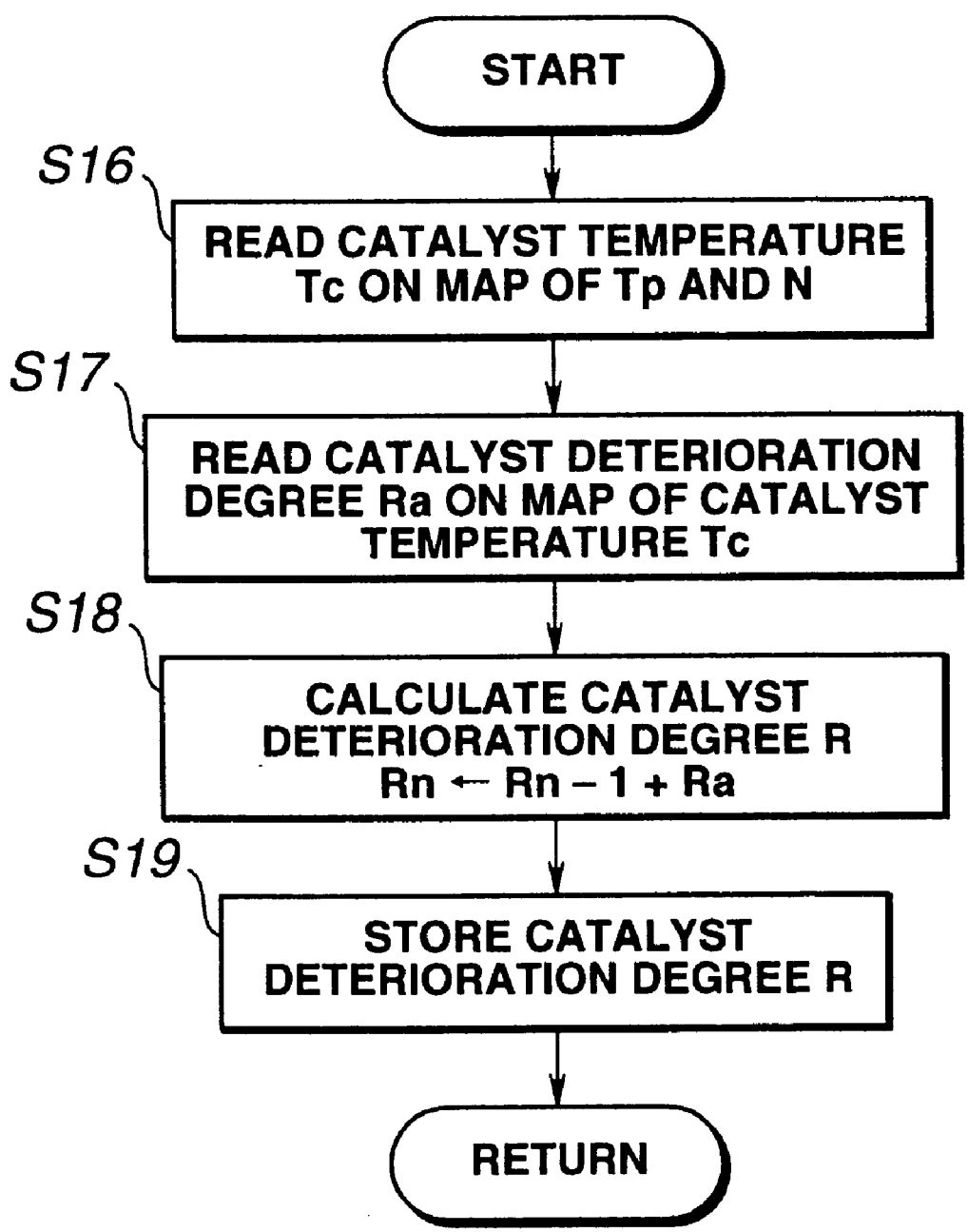
FIG. 8 is a flowchart of a subroutine for estimating the degree of deterioration of the catalyst for use in the embodiment of FIG. 1.
Figure 16:
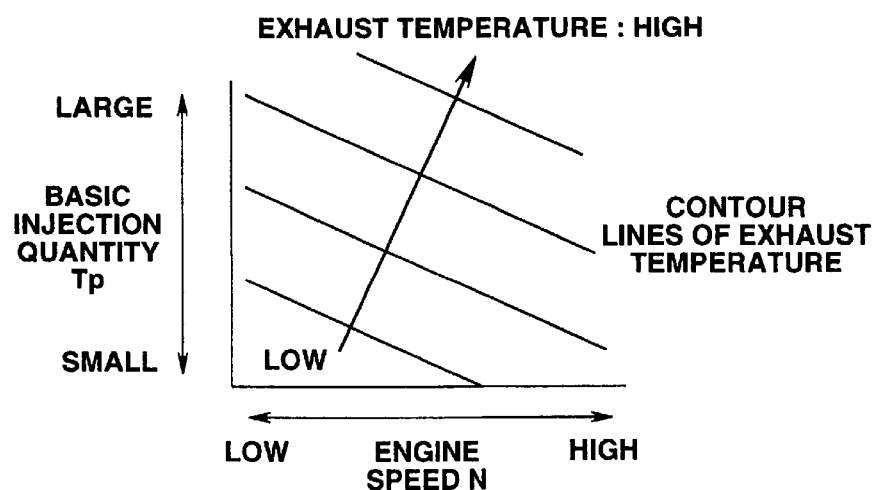
FIG. 16 is a graph of a relation between an operating condition of an internal combustion engine and an exhaust gas temperature.
Figure 17:
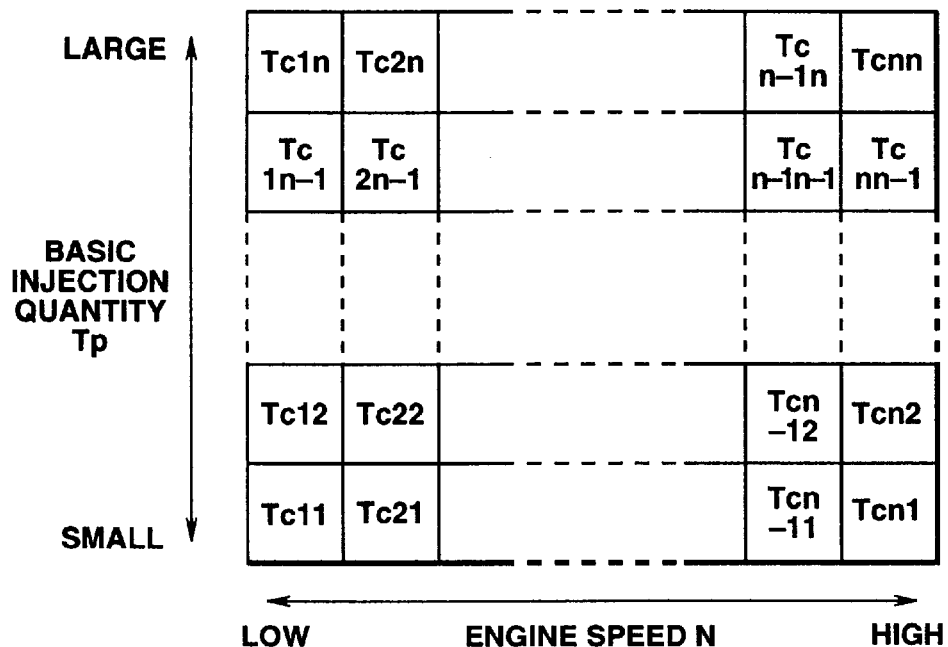
FIG. 17 is an illustration of a map of a catalyst temperature for a basic fuel injection quantity Tp and an engine speed N.
Figure 18:
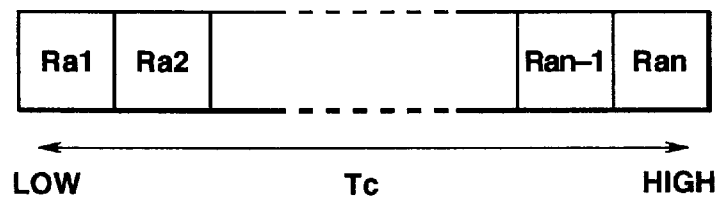
FIG. 18 is an illustration of a map of a catalyst deterioration degree Ra for a catalyst temperature Tc.

FIG. 8 shows a flowchart for obtaining the catalyst deterioration degree R from the history of use or operation of the internal combustion engine 1. The catalyst temperature can be roughly determined depending upon the exhaust temperature of the internal combustion engine 1. The exhaust temperature can be roughly determined depending upon the basic fuel injection quantity Tp and the engine speed N as shown in FIG. 16. Thus, at step S16, on the basis of the map using the basic fuel injection quantity Tp and the engine speed N as parameters or variables as shown in FIG. 17, the catalyst temperature Tc is estimated. The catalyst deterioration progresses in relation to the catalyst temperature. Thus at step S17, the catalyst deterioration degree Ra corresponding to the estimated catalyst temperature Tc is obtained by using such a map shown in FIG. 18. Also at step S18, the catalyst deterioration degrees Ra are added up to obtain an age-based or aged catalyst deterioration degree R. At step S19, the catalyst deterioration degree R is stored in a memory.

Figure 9:
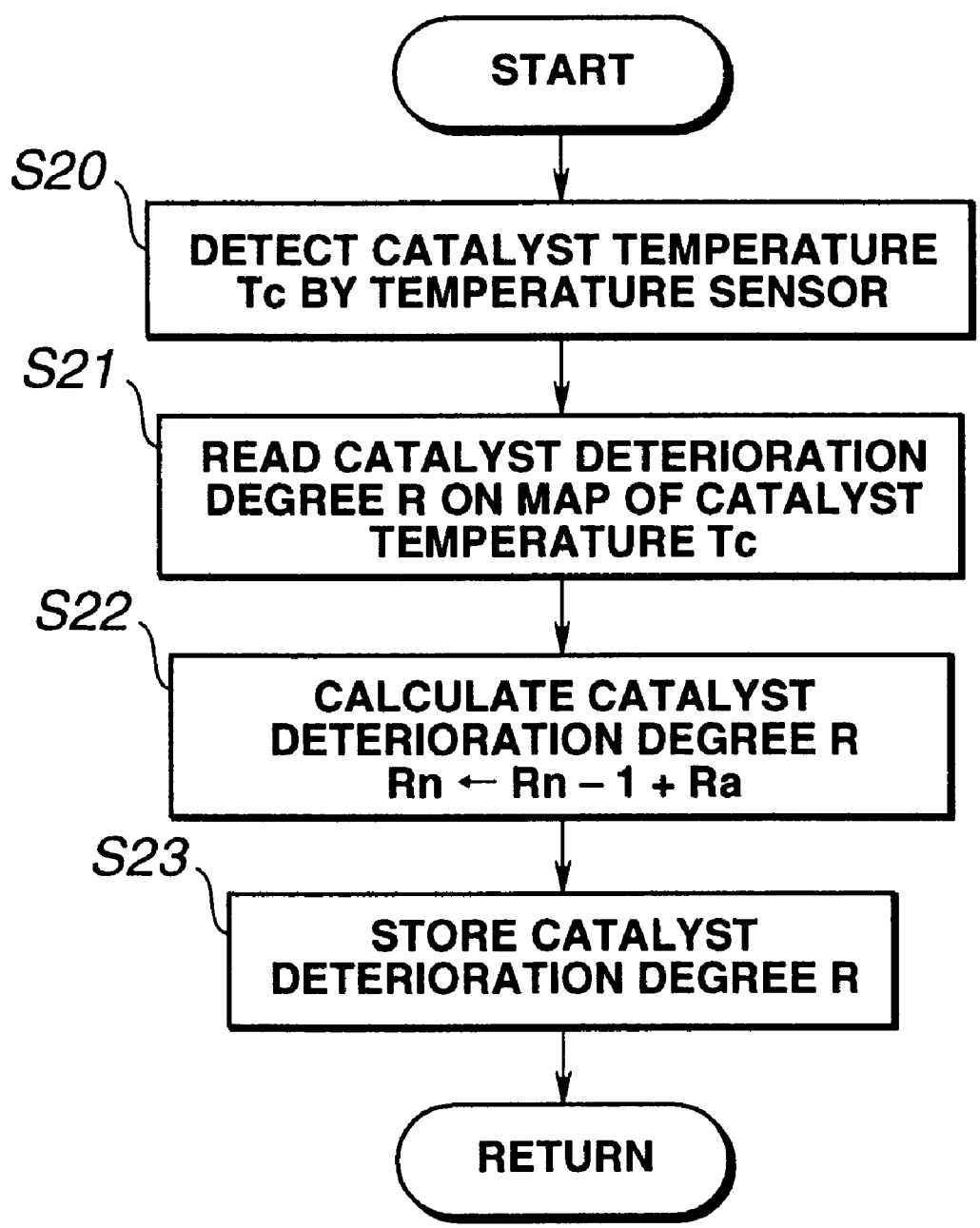
FIG. 9 is a flow chart of a subroutine for estimating the degree of deterioration of the catalyst for use in a second embodiment of FIG. 20.
Figure 20:
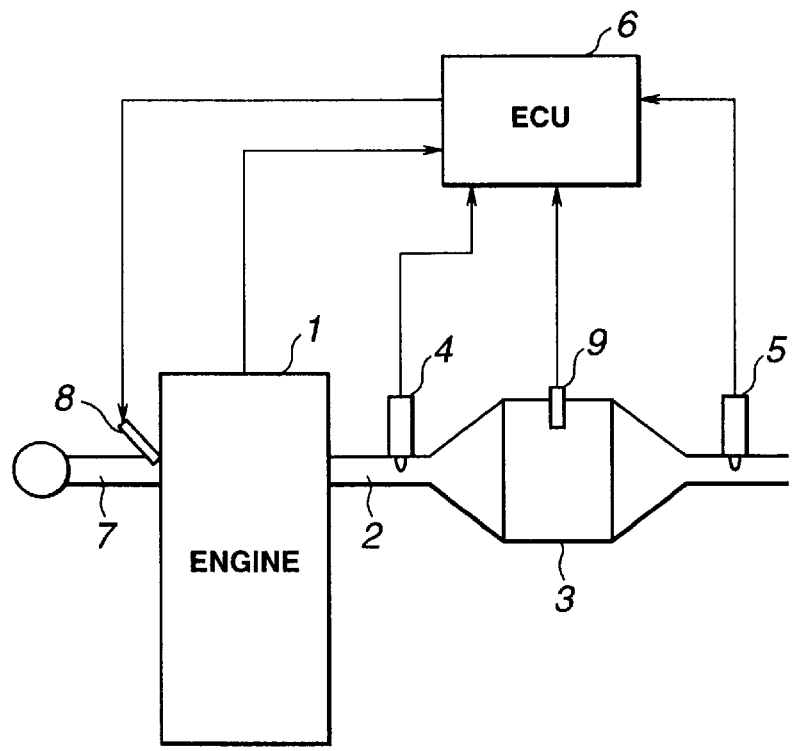
FIG. 20 is a view similar to FIG. 5 but shows a second embodiment of the present invention.

FIG. 20 shows a second embodiment in which a catalyst temperature sensor 9 is provided to the catalytic converter 3 for detecting the catalyst temperature. FIG. 9 shows a flowchart for obtaining the catalyst deterioration degree R on the basis of the history of catalyst temperature which is obtained by the catalyst temperature sensor 9 provided as above. By the catalyst temperature sensor 9, the catalyst temperature Tc is detected directly (step S20). Then, the catalyst deterioration degree Ra corresponding to the catalyst temperature Tc is obtained by using a map (step S21). The catalyst deterioration degrees Ra are added up in sequence to obtain the age-based catalyst deterioration degree R (step S22) and stored in the memory (step S23). In the meantime, in case the catalyst deterioration sensor 9 is provided in this manner, the above described basic hydrogen correction quantity Sa can be determined on the basis of the catalyst temperature Tc.

Figure 21:
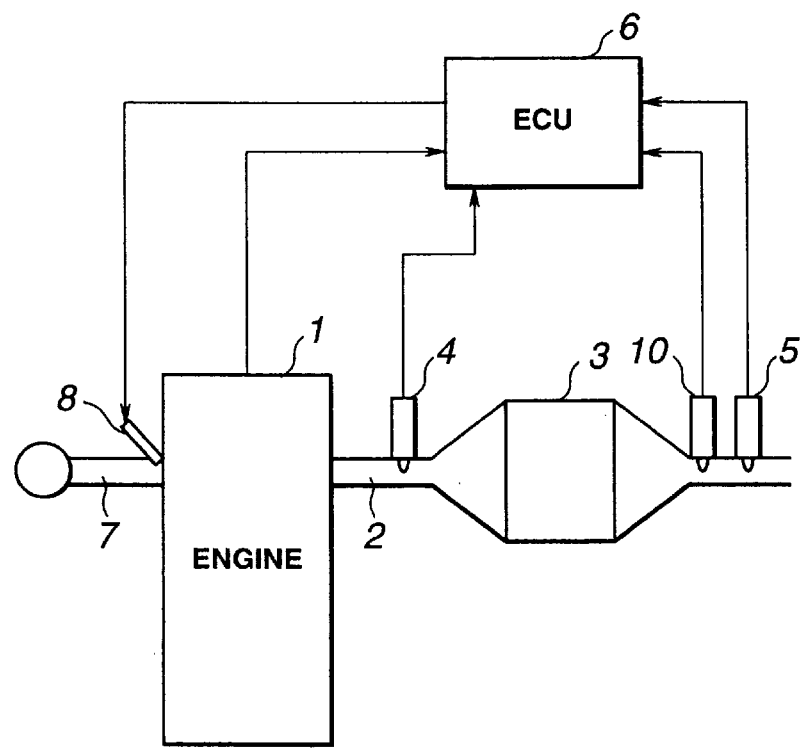
FIG. 21 is a view similar to FIG. 5 but shows a third embodiment of the present invention.
Figure 22:
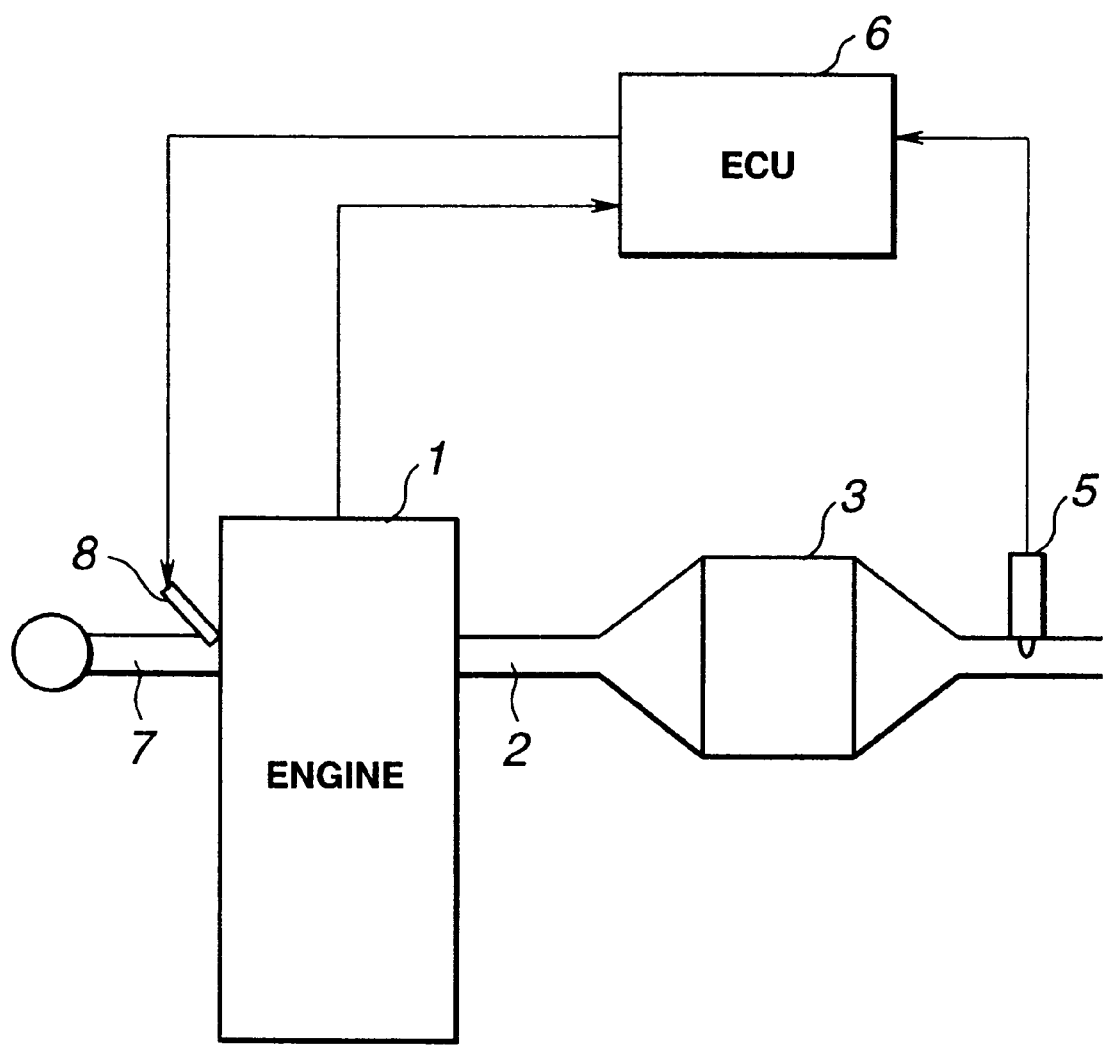
FIG. 22 is a view similar to FIG. 5 but shows a fourth embodiment of the present invention.

FIG. 21 shows a third embodiment in which a hydrogen sensor 10 which is directly reactive to a hydrogen concentration is used for measuring the degree of water gas reaction. The hydrogen sensor 10 includes, for example, a catalytic layer selectively reactive to hydrogen and a catalytic layer not reactive to hydrogen and is operative to detect the hydrogen concentration on the basis of the difference in temperature between the two layers.

Figure 10:
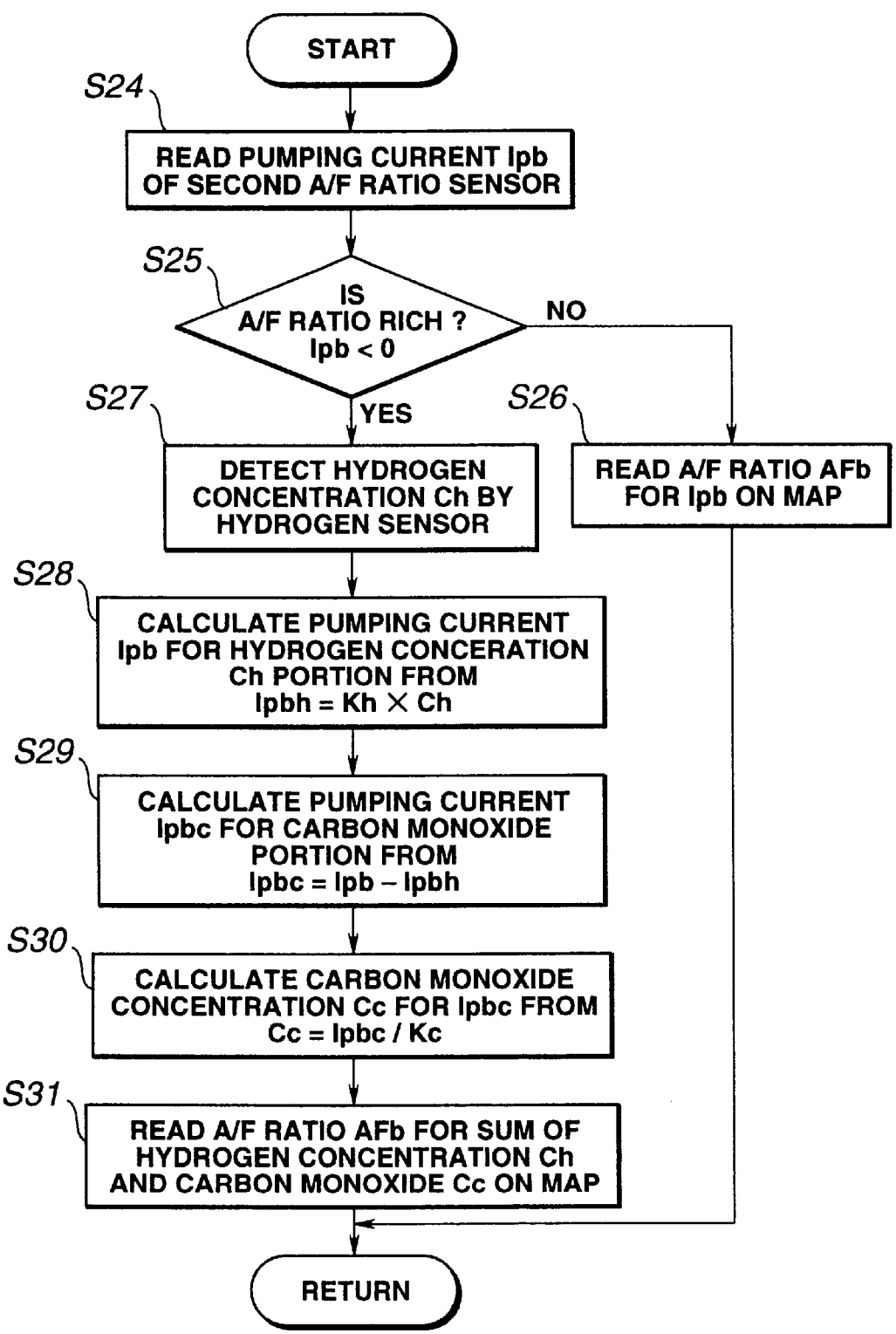
FIG. 10 is a flowchart of a subroutine for correcting the output of the second A/F ratio sensor for use in a third embodiment of FIG. 21.

The flowchart in FIG. 10 shows a subroutine of the step S5 for the third embodiment, which will be described hereinlater. At step S24, the pumping current Ipb of the second A/F ratio sensor 5 is read. At step S25, it is judged on the basis of the pumping current Ipb whether the A/F ratio is rich, i.e., the pumping current is negative or not. As described above, in case the A/F ratio is lean, there is scarcely an influence of water gas reaction to the pumping current Ipb. Thus, no correction is made to the pumping current Ipb, and the program proceeds to step S26. At step S26, the A/F ratio AFb is determined on the basis of the pumping current Ipb without making any correction thereto. This is the same as the above described step S15 in FIG. 7.

Figure 19:
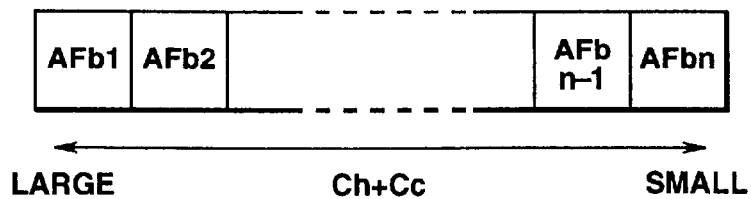
FIG. 19 is an illustration of a map of an A/F ratio AFb for the sum of an oxygen concentration and a carbon monoxide concentrations.

In case the A/F ratio is judged as rich at step S25, the program proceeds to the step S27 and the following steps to make a correction of the output with respect to the water gas reaction. Firstly, at step S27, the hydrogen concentration Ch detected by the hydrogen sensor 10 is read. Then, at step S28, the pumping current Ipbh for this hydrogen concentration Ch portion is obtained from Ipbh=Kh×Ch where Kh is the sensitivity to hydrogen and given as a constant. At step S29, by subtracting the above described hydrogen concentration Chb portion from the actual pumping current Ipb of the second A/F ratio sensor 5, the pumping current Ipbc caused by carbon monoxide is obtained. At step S30, from the pumping current Ipbc for the carbon monoxide portion is obtained the carbon monoxide concentration Cc reversely. Specifically, the carbon monoxide Cc is obtained from Cc=Ipbc/Kc where Kc is the sensitivity to carbon monoxide and given as a constant. In the meantime, such a sensitivity is determined on the basis of a diffusion speed of a gas and Kh is about four times as large as Kc. Then, at step S31, the sum of the hydrogen concentration Ch and carbon monoxide concentration Cc is obtained and the A/F ratio AFb corresponding to the value of the sum is obtained by using such a map shown in FIG. 19.

The entire contents of Japanese Patent Application P10-180070 is incorporated herein by reference.

Although the invention has been described above by reference to certain moments of the invention, the invention is not limited to the embodiments described above. Modifications and variations of the embodiments described above will occur to those skilled in the art, in light of the above teachings. The cope of the invention is defined with reference to the following claims.

For example, while in the third embodiment the hydrogen sensor which is directly reactive to the hydrogen concentration is used for measuring the degree of water gas reaction, this is not for the purpose of limitation but a carbon monoxide sensor which is directly reactive to a carbon monoxide concentration can be used for obtaining the carbon monoxide concentration Cc and hydrogen concentration Ch in the similar manner as above and it is also possible to obtain the corrected A/F ratio AFb.

Further, the present invention is not limited to the above embodiments having the A/F ratio sensors 4 and 5 disposed upstream and downstream of the catalytic converter 3 but can be similarly applied to such an exhaust emission control system having only the A/F ratio sensor 5 disposed downstream of the catalytic converter 3.

Further, the target A/F ratio to be attained by the fuel injection quantity feedback control is not limited to the stoichiometric A/F ratio but can be, for example, an A/F ratio which is richer than the stoichiometric.

What is claimed is:

1. An exhaust emission control system for an internal combustion engine having an exhaust passage comprising:
   a catalytic converter disposed in said exhaust passage:
   a wide-range A/F ratio sensor disposed in said exhaust passage at a location downstream of said catalytic converter for detecting an A/F ratio of a mixture supplied to said engine; and
   a control unit having a detecting section for detecting the degrees of water gas reaction caused in said catalytic converter and a correcting section for correcting the A/F ratio detected by said A/F ratio sensor on the basis of said degree of water gas reaction;
   wherein said detecting section comprises a section for estimating a catalyst deterioration degree of said catalytic converter, said degree of water gas reaction being detected on the basis of said catalyst deterioration degree.

2. An exhaust emission control system according to claim 1, wherein said detecting section further comprises a section for estimating a catalyst temperature of said catalytic converter, said catalyst deterioration degree being determined on the basis of said catalytic temperature.

3. An exhaust emission control system according to claim 1, wherein said catalyst deterioration degree is estimated on the basis of an operating condition of said engine.

4. An exhaust emission control system according to claim 1, wherein said catalyst deterioration degree is estimated on the basis of a history of operation of said engine.

5. An exhaust emission control system according to claim 1, further comprising a catalyst temperature sensor for detecting a catalyst temperature of said catalytic converter, said catalyst deterioration degree being determined on the basis of said catalyst temperature.

6. An exhaust emission control system for an internal combustion engine having an exhaust passage, comprising:
   a catalytic converter disposed in said exhaust passage;
   a wide-range A/F ratio sensor disposed in said exhaust passage at a location downstream of said catalytic converter for detecting an A/F ratio of a mixture supplied to said engine and producing as an output a pumping current representative of the A/F ratio detected thereby;
   a hydrogen sensor disposed in said exhaust passage at a location downstream of said catalytic converter for detecting a hydrogen concentration in the exhaust gas of said engine; and
   a control unit for determining a carbon monoxide concentration in the exhaust gas through calculation of a pumping current for the hydrogen concentration and a pumping current for a carbon monoxide concentration in the exhaust gas on the basis of the hydrogen concentration detected by said hydrogen sensor, and correcting the A/F ratio detected by said A/F ratio sensor on the basis of the hydrogen concentration and the carbon monoxide concentration.

7. An exhaust emission control system for an internal combustion engine having an exhaust passage, comprising:
   a catalytic converter disposed in said exhaust passage;
   a wide-range A/F ratio sensor disposed in said exhaust passage at a location downstream of said catalytic converter for detecting an A/F ratio of a mixture supplied to said engine and producing as an output a pumping current representative of the A/F ratio detected thereby;
   a carbon monoxide sensor disposed in said exhaust passage at a location downstream of said catalytic converter for detecting a carbon monoxide concentration in the exhaust gas of said engine; and
   a control unit for determining a hydrogen concentration in the exhaust gas through calculation of a pumping current for the carbon monoxide concentration and a pumping current for a hydrogen concentration in the exhaust gas on the basis of the carbon monoxide concentration detected by said carbon monoxide sensor, and correcting the A/F ratio detected by said A/F ratio sensor on the basis of the carbon monoxide concentration and the hydrogen concentration.

8. An exhaust emission control method for an internal combustion engine having an exhaust passage, a catalytic converter disposed in the exhaust passage, a wide-range A/F ratio sensor disposed in the exhaust passage at a location downstream of the catalytic converter for detecting an A/F ratio of a mixture supplied to the engine, and a control unit having a detecting section for detecting the degree of water gas reaction caused in the catalytic converter and a correcting section for correcting a detected value of the A/F ratio detected by the A/F ratio sensor on the basis of the degree of water gas reaction, the control method comprising:

estimating a catalyst deterioration degree of said catalytic converter; and detecting a degree of water gas reaction on the basis of said catalyst deterioration degree.

9. A method of controlling exhaust emission for an internal combustion engine having an exhaust passage and a catalytic converter disposed in the exhaust passage, comprising the steps of:

sensing and A/F ratio using a wide-range A/F ratio sensor disposed in the exhaust passage at a location downstream of the catalytic converter;

estimating catalytic deterioration;

detecting, on the basis of the estimated catalytic deterioration, the degree of water gas reaction in the catalytic converter; and correcting the A/F ratio detected by the A/F ratio sensor on the basis of the degree of water gas reaction.

\* \* \* \* \*